Oct. 25, 1966   R. G. RUTHERFORD   3,280,843
VALVE CONSTRUCTION
Filed Sept. 21, 1962
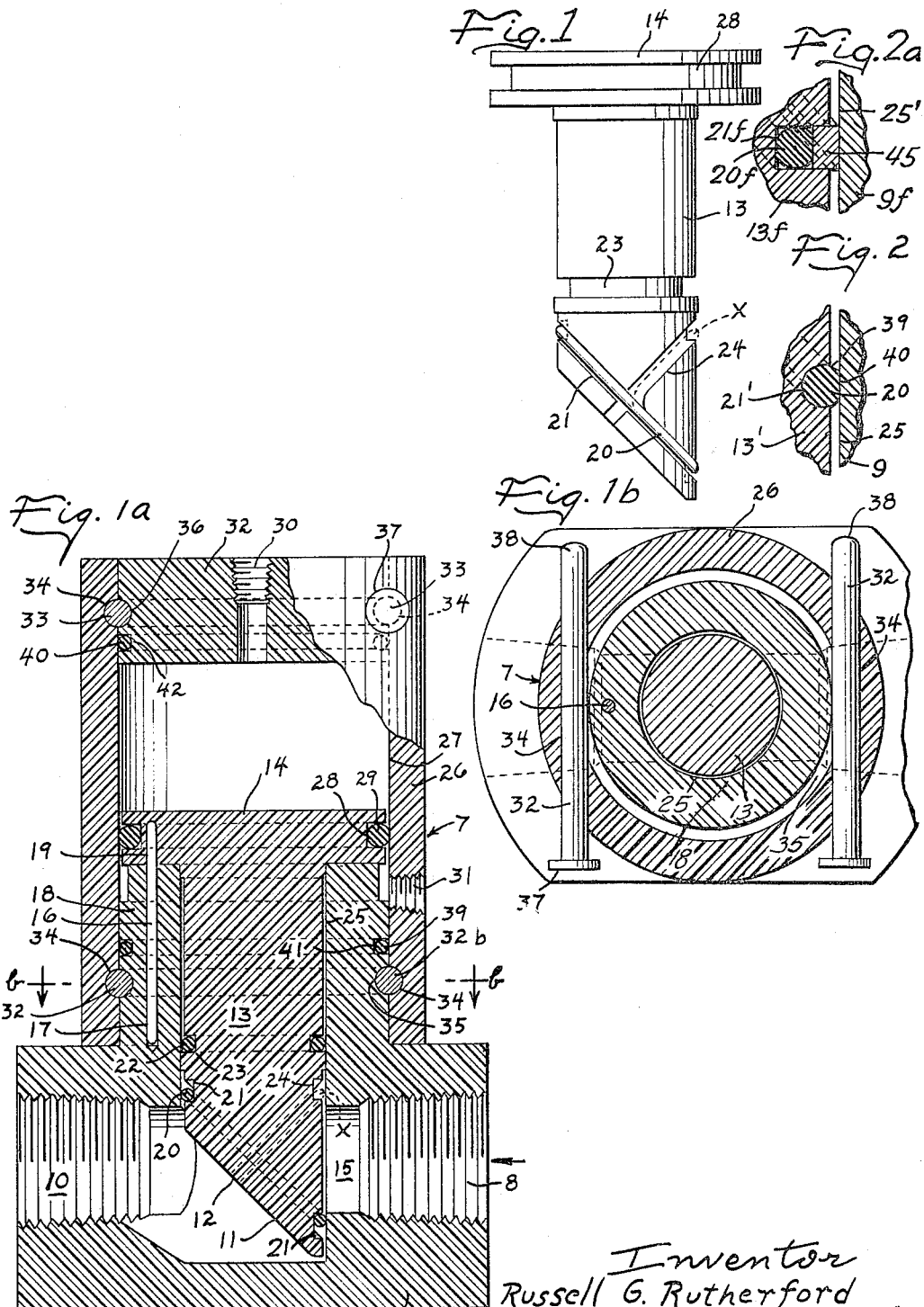
Inventor
Russell G. Rutherford

United States Patent Office

3,280,843
Patented Oct. 25, 1966

3,280,843
VALVE CONSTRUCTION
Russell G. Rutherford, R.R. 6, Hutchins Park,
Rockford, Ill.
Filed Sept. 21, 1962, Ser. No. 225,200
8 Claims. (Cl. 137—625.47)

This invention relates to valves and is more particularly concerned with improvements in valves used for cut-off purposes in various filling operations.

One of the salient features of the valves of my invention is the use of plastic parts and the ease and facility with which the same may be assembled, taken apart, and reassembled, so as to permit thoroughly cleaning the same, as required for sanitation where food products are being handled, and as also becomes necessary with various other materials, valves made in accordance with my invention having been used in the handling of a wide range of liquids and semi-liquid materials or slurries. For this purpose, two longitudinally spaced annular grooves are provided in the inner one of two telescoping parts, namely, an inner groove to receive an O-ring for sealing purposes, and an outer groove to receive a pair of cylindrical retaining pins disposed in coplanar relationship to the outer groove and in diametrically opposed parallel relationship to one another and spaced so as to enter the last mentioned groove when entered with a close fit in a pair of holes provided therefor in properly spaced parallel relation in the outer part, thereby providing the desired quick detachability and yet insuring a leak-proof assembly.

Another salient feature of the valves of my invention is the unique application of O-rings to the reciprocable plug in axially spaced relationship, one ring being entered in an annular groove that is normal to the plug axis, and the other being entered in another annular groove that is inclined at an acuate angle with respect to the plug axis, the angularity of the latter groove depending on the diameter of the port in the body that is to be sealed off by the elliptical inclined O-ring in said groove. In some installations, another annular groove is provided in the plug at the same angle to the axis as the other inclined groove but in transverse intersecting relationship thereto so that the second O-ring can be entered half in one of these inclined grooves and half in the other to seal off the body port straddled by this V-shaped generally elliptical ring. In certain installations operating under higher pressure, the O-rings have a snap fit in grooves that are slightly beyond semi-circular form so that the entrance to the groove is narrower than the diameter, necessitating some compression of the O-rings in entering the same in the grooves, and therefore reducing likelihood of the O-rings becoming displaced from the grooves in the operation of the valve. In certain applications, an elliptical metallic piston ring of rectangular section is employed with an elliptical rubber O-ring behind it in the same elliptical groove to give the piston ring increased outward pressure on the wall and prevent leakage when handling certain fine and gritty granular materials which the rubber O-ring of circular section could not cope with alone.

The invention is illustrated in the accompanying drawing, in which—

FIG. 1 is a side view of a reciprocable gate valve plunger showing in full lines and dotted lines two different applications of the lower O-ring;

FIG. 1a is a vertical section through a complete valve utilizing a plunger having its lower O-ring applied as in FIG. 1 but indicating in dotted lines the alternative arrangement shown in dotted lines in FIG. 1;

FIG. 1b is a cross-section on the line b—b of FIG. 1a;

FIG. 2 is an enlarged sectional detail showing another form of groove for the O-rings in lieu of the channel shaped grooves shown in FIG. 1, and FIG. 2a is another enlarged sectional detail showing an elliptical metallic piston ring of rectangular section in combination with an elliptical rubber O-ring of circular section.

Similar reference numerals are applied to corresponding parts throughout these views.

Referring to FIGS. 1, 1a and 1b, the reference numeral 7 designates a valve generally, operable either by air, or vacuum, or hydraulically, in timed relation to the reciprocation of two interconnected pistons in a pump of the kind disclosed in my copending application, Serial No. 157,759, filed December 7, 1961, designed for the handling of food slurries, like peas, corn, cherries, olives, and so forth, pumps so constructed having been used for many different purposes, handling liquids of all kinds and semi-liquids of many kinds, some to the point where the only limitation seems to be that the material be only liquid enough to hold a vacuum, as for example:

(1) Cheese, such as cottage cheese and various dehydrated cheeses in vegetable oil;

(2) Fats, namely, animal fats, vegetable fats, and chopped fish slurries;

(3) Chemicals, namely, all liquid chemicals and chemical slurries;

(4) Food slurries, namely, peas, corn, cherries, olives, and concentrated chicken slurry, and other slurries, down to some that are only about 25% liquid;

(5) Waxes;

(6) Glues;

(7) Hand soaps;

(8) Mashed potatoes;

(9) Paints, varnishes and enamels, and

(10) Ice cream mixes.

When the present valves 7 are used I have found that there is a loss of only about 1 percent or less damage by actual count in the handling of peas, corn, cherries, olives, and so forth.

In the case of food products, the law requires cleaning of the equipment satisfactorily, and, with the present novel construction of the valve 7, that presents no problem because, as will soon appear, all of the parts that come into contact with the food are made of plastic material not subject to attack by acids and alkalies, and all of these parts can be easily disassembled and reassembled so that there are no places where food can lodge and spoil. The easy disassembly and reassembly is practically of equal importance in the handling of various other liquid and semi-liquid materials, some of which, if the equipment were left uncleaned between uses, would dry and harden and positively interfere with operation of the equipment.

The fluid or semi-fluid material is delivered through the inlet 8 in the generally T-shaped plastic valve body 9 and is discharged through the outlet 10 when the gate 11 defined by the bevelled end 12 of the reciprocable plastic cylindrical plug or plunger 13 on piston 14 is raised to uncover port 15, allowing the material to flow from inlet 8 to outlet 10 under pressure. A vertical metallic pin 16 having a slip fit in a vertical hole 17 in the cylindrical neck portion 18 of the T-shaped body 9 has a drive fit in a vertical hole 19 in the piston 14 and serves to hold the plug 13 against turning, which is important because the inclined O-ring 20 in the annular inclined groove 21 has to maintain proper registration with respect to port 15 to function properly with the other O-ring 22 provided in the other annular groove 23 located above and in vertically spaced relation to groove 21 but normal to the axis of plug 13, the pressure in the closed position of gate 11 acting upwardly on O-ring 22 and downwardly on O-ring 20 for a good seal against leakage in either direction. In some installations, it is preferred to have the O-ring 20 applied as indicated in dotted lines at X in FIGS. 1 and 1a, namely, with one-half of the circumference of the O-ring 20 disposed in the annular groove 21 and with the other half disposed in another annular groove 24 inclined like the groove 21 but in diametrically opposed and intersecting relationship thereto, as best appears in FIG. 1. With this arrangement, the pressure of the material is both upward and downward on the same O-ring 20 to an equal degree, because the O-ring 20 seals off the port 15 throughout its circumference when the gate 11 is closed as shown in FIG. 1a. O-ring 22 under these conditions seals off port 15 from the cylindrical bore 25 in which the plug 13 operates with a suitable operating clearance.

A plastic cylindrical sleeve 26 has a close telescoping fit on the neck 18 and the bore 27 thereof provides a working cylinder for the piston 14, the latter having an annular groove 28 provided therein in which an O-ring 29 is entered to seal the joint between the piston and cylinder to prevent leakage of whatever motive fluid is employed for operation of the piston and delivered through ports 30 and 31 in the head 32 and side wall of the cylinder, respectively, head 32 being a fixed plastic plug entered in the upper end of the sleeve 26. The latter is secured at its opposite ends to the neck 18 and plug 32 by means of two pairs of cylindrical retaining pins 32 and 33, the pins of each pair being in diametrically opposed relationship and received with a close fit in parallel holes 34 provided in diametrically opposed relation in the sleeve 26 nearly tangent to the bore 27 but intersecting the same intermediate their ends to the extent of half the diameter of these holes, as clearly seen in FIG. 1a, whereby to enable the pins 32 and 33 to cooperate with semicircular annular grooves 35 and 36 provided in the neck 18 and plug 32, respectively, to fasten the sleeve 26 securely but detachably to neck 18 and likewise secure the plug 32 securely but detachably in the outer end of sleeve 26. The pins 32 and 33 have headed ends 37 to facilitate their withdrawal and also facilitate driving the same into place, the other ends of the pins being suitably rounded, as shown at 38 in FIG. 1b to facilitate their entry in the holes 34. O-rings 39 and 40 are entered in channel-shaped annular grooves 41 and 42 provided in the neck 18 and plug 32, respectively, in inwardly spaced relationship to the annular semi-circular grooves 35 and 36, respectively, to provide effective seals against leakage of whatever motive fluid is employed for operation of the piston 14. Thus, although I obtain the desired quick detachability and equally quick assembly, that result is not obtained at any sacrifice to leak-proof joints anywhere in the construction.

Referring to FIGURE 2, in the case of a heavier duty valve operating at a pressure of say 60 to 100 pounds, the plug 13′ in the case of at least the inclined elliptical O-ring or rings 20 is provided with an annular groove or grooves 21′ of slightly more than a semi-circle in depth and of approximately the same diameter as the circular section of the O-ring, as shown in FIG. 2, so that the O-ring 20 has to be compressed slightly to snap it into place past the narrow entrance 39, there being sufficient rubber of the O-ring projecting from the groove 21′ past the entrance 39 requiring compression in entering the bore 25′ to provide a good seal as indicated at 40 in FIG. 2.

In the constructions of FIGS. 1, 1a, and 1b, and in any others where a truly elliptical O-ring is stretched in a truly elliptical groove of channel form, I contemplate in the handling of certain fine and gritty granular materials that cannot be handled efficiently using rubber O-rings alone providing an elliptical metallic piston ring in combination with the rubber O-ring, as shown in FIG. 2a, the elliptical channel groove 21f in cylindrical plug 13f being made deep enough to house the rubber O-ring 20f of circular section in stretched and compressed condition behind the elliptical metallic piston ring 45 of rectangular section. The piston ring 45 in addition to having its inherent springiness to hug the wall of the bore 25′, in which the plug 13f is reciprocable, utilizes the resilience of the compressed O-ring 20f to insure an even better seal, the metal ring meanwhile scraping the wall 25′ clean to prevent leakage past it, whereas a rubber O-ring of circular section when used alone under these more difficult operating conditions, working with fine gritty material is apt to allow some leakage past it and be worn out too soon.

While I have shown and described plastic material as being used almost exclusively in the valves of my invention, especially where these valves are to be used in the handling of foodstuffs, and sanitation is a big factor, it will be understood that I do not at all limit myself to the use of plastics, because in many other applications of my valves metal will be used, and, especially in some high pressure application, metal is essential.

It is believed the foregoing description conveys a good understanding of the objects and advantages of my invention. The appended claims have been drawn to cover all legitimate modifications and adaptations.

I claim:

1. A valve comprising a body having inlet and outlet ports communicating with a passage provided in said body, a solid imperforate cylindrical gate type valve plug reciprocable with a working fit in a bore provided in said body in transverse intersecting relationship to said passage to control communication between said ports and having its inner end bevelled off in a plane at an acute angle to the plug axis to define a cutoff edge at the thin lower end of the bevelled end portion relative to the inlet port, an O-ring disposed in sealing engagement in said bore and stretched to generally elliptical form in an annular groove that is provided in said plug in axially spaced relation to said bevel and also inclined at an acute angle with respect to the plug axis so that the low side of the ring in the closed position of the plug is below and the high side of the ring is above the inlet port, the plug being disposed so that the ring serves to seal off said inlet port from said outlet port, means for reciprocating said plug from closed to open position, and vice versa, and means to prevent rotation of said plug, whereby to maintain both the bevelled end of the plug and the O-ring in operative relationship to said inlet port, said plug also having another annular groove provided therein at the same level with the first mentioned groove but inclined in the opposite direction and located in diametrically opposed intersecting relation to the first groove, the upper half circumference of said O-ring being entered in the other groove on the same half circumference of said plug as the lower half circumference of said O-ring, sealing off the inlet port from said bore in the closed position of said plug.

2. A valve comprising a body having inlet and outlet ports communicating with a passage provided in said body, a cylindrical plug disposed with a working fit in a bore provided in said body in transverse intersecting relationship to said passage to control communication between said ports, a single circular O-ring disposed in sealing engagement in said bore and stretched to an elliptical form on said plug with one half of its circumference in one annular groove provided in said plug inclined relative to the plug axis in one direction and with the other half of its circumference in another annular groove provided in said plug in intersecting relation to the first groove and inclined relative to the plug axis in the opposite direction, the upper half circumference of said O-ring and the lower half circumference of said O-ring together defining a V and being both disposed on the same half circumference of said plug, the low side of the ring being below and the high side above the inlet port, the plug being turned so that the ring serves to seal off said inlet port from outlet port, and means for moving said plug from closed to open position, and vice versa.

3. A valve as set forth in claim 2, wherein the plug is reciprocable to and from closed position, and means is provided to prevent rotation of said plug, whereby to maintain the O-ring in operative relationship to said inlet port, the plug having the inner end thereof bevelled off in a plane parallel to one of said grooves and the lower half circumference of said O-ring.

4. A valve comprising a body having inlet and outlet ports communicating with a passage provided in said body, a cylindrical plug reciprocable with a working fit in a bore provided in said body in transverse intersecting relationship to said passage to control communication between said ports, an O-ring stretched to generally elliptical form in an annular groove provided in said plug inclined at an acute angle with respect to the plug axis so that in the closed position of the plug the low side of the ring is below and the high side of the ring is above the inlet port, the plug in closed position being disposed so that the ring serves to seal off said inlet port from said outlet port, means for reciprocating said plug from closed to open position, and vice versa, means to prevent rotation of said plug, whereby to maintain the O-ring in operative relationship to said inlet port, said plug having its inner end bevelled off in a plane in axially spaced relation to said groove and O-ring to define a cut-off edge at the thin lower end of the bevelled end portion relative to the inlet port, said body having a cylindrical neck portion concentric with said bore, a sleeve disposed in fixed close telescoping relation with said neck and defining a working cylinder therein between the end of said neck and a wall closing the outer end of said sleeve, and a piston in the form of a cylindrical coaxial enlargement of the upper end of said plug substantially equal in diameter to the cylindrical neck portion of said body so as to be adapted to serve as a piston in said cylinder and being reciprocable in said cylinder for reciprocating said plug, said cylinder having ports provided therein on opposite sides of said piston for delivery and discharge of motive fluid.

5. A valve comprising a body having inlet and outlet ports communicating with a passage provided in said body, a cylindrical plug reciprocable with a working fit in a bore provided in said body in transverse intersecting relationship to said passage to control communication between said ports, an O-ring stretched to generally elliptical form in an annular groove provided in said plug inclined at an acute angle with respect to the plug axis so that in the closed position of the plug the low side of the ring is below and the high side of the ring is above the inlet port, the plug in closed position being disposed so that the ring serves to seal off said inlet port from said outlet port, means for reciprocating said plug from closed to open position, and vice versa, means to prevent rotation of said plug, whereby to maintain the O-ring in operative relationship to said inlet port, said plug having its inner end bevelled off in a plane in axially spaced relation to said groove and O-ring to define a cut-off edge at the thin lower end of the bevelled end portion relative to the inlet port, said body having a cylindrical neck portion concentric with said bore, a sleeve disposed in fixed close telescoping relation with said neck and defining a working cylinder therein between the end of said neck and a wall closing the outer end of said sleeve, and a piston reciprocable in said cylinder in fixed relation to the outer end of said first mentioned plug for reciprocating said plug, said cylinder having ports provided therein on opposite sides of said piston for delivery and discharge of motive fluid, said sleeve being adapted to be removed and replaced to facilitate cleaning of the cylinder and piston, the neck for this purpose having an annular groove provided therein intermediate its ends receiving an O-ring of compressible resilient material adapted to be compressed radially between the annular groove and the side of said sleeve when the sleeve is assembled on said neck, and means for quickly detachably securing the sleeve to said neck comprising another annular groove provided in said neck and parallel holes provided in said sleeve in diametrically opposed relationship opening intermediate their ends to the interior of the sleeve and adapted to be placed in register with diametrically opposed portions of the last mentioned annular groove, and elongated pins inserted removably in said holes and having portions intermediate their ends projecting into said annular groove to retain the sleeve against axial displacement relative to said neck.

6. A valve comprising a body having inlet and outlet ports communicating with a passage provided in said body, a cylindrical plug reciprocable with a working fit in a bore provided in said body in transverse intersecting relationship to said passage to control communication between said ports, an O-ring stretched to generally elliptical form in an annular groove provided in said plug inclined at an acute angle with respect to the plug axis so that in the closed position of the plug the low side of the ring is below and the high side of the ring is above the inlet port, the plug in closed position being disposed so that the ring serves to seal off said inlet port from said outlet port, means for reciprocating said plug from closed to open position, and vice versa, means to prevent rotation of said plug, whereby to maintain the O-ring in operative relationship to said inlet port, said plug having its inner end bevelled off in a plane in axially spaced relation to said groove and O-ring to define a cut-off edge at the thin lower end of the bevelled end portion relative to the inlet port, said body having a cylindrical neck portion concentric with said bore, a sleeve disposed in fixed close telescoping relation with said neck and defining a working cylinder therein between the end of said neck and a wall closing the outer end of said sleeve, and a piston reciprocable in said cylinder in fixed relation to the outer end of said first mentioned plug for reciprocating said plug, said cylinder having ports provided therein on opposite sides of said piston for delivery and discharge of motive fluid, the wall in the outer end of said sleeve being defined by a closure plug adapted to be removed and replaced to facilitate cleaning of the cylinder and piston, said plug for this purpose having an annular groove provided therein intermediate its ends receiving an O-ring of compressible resilient material adapted to be compressed radially between the annular groove and the inside of said sleeve when the plug is inserted therein, and means for quickly detachably securing said closure plug in said sleeve comprising another annular groove provided in said plug and parallel holes provided in said sleeve in diametrically opposed relationship opening intermediate therein to the inside of said sleeve and adapted to be placed in register with diametrically opposed portions of the last mentioned annular groove, and elongated pins inserted removably in said holes and having portions intermediate their ends projecting into said annular groove to retain the plug against axial displacement relative to said sleeve.

7. A valve comprising a body having inlet and outlet ports communicating with a passage provided in said body, a cylindrical plug reciprocable with a working fit in a bore provided in said body in transverse intersecting relationship to said passage to control communication between said ports, an O-ring stretched to generally elliptical form in an annular groove provided in said plug inclined at an acute angle with respect to the plug axis so that in the closed position of the plug the low side of the ring is below and the high side of the ring is above the inlet port, the plug in closed position being disposed so that the ring serves to seal off said inlet port from said outlet port, means for reciprocating said plug from closed to open position, and vice versa, means to prevent rotation of said plug, whereby to maintain the O-ring in operative relationship to said inlet port, said plug having its inner end bevelled off in a plane in axially spaced relation to said groove and O-ring to define a cut-off edge at the thin lower end of the bevelled end portion relative to the inlet port, said body having a cylindrical neck portion concentric with said bore, a sleeve disposed in fixed close telescoping relation with said neck and defining a working cylinder therein between the end of said neck and a wall closing the outer end of said sleeve, and a piston in the form of a cylindrical coaxial enlargement of the upper end of said plug substantially equal in diameter to the cylindrical neck portion of said body so as to be adapted to serve as a piston in said cylinder and being reciprocable in said cylinder for reciprocating said plug, said cylinder having ports provided therein on opposite sides of said piston for delivery and discharge of motive fluid, said sleeve being adapted to be removed and replaced to facilitate cleaning of the cylinder and piston, the neck for this purpose having an annular groove provided therein intermediate its ends receiving an O-ring of compressible resilient material adapted to be compressed radially between the annular groove and the inside of said sleeve when the sleeve is assembled on said neck, and means for detachably securing the sleeve to said neck.

8. A valve comprising a body having inlet and outlet ports communicating with a passage provided in said body, a cylindrical plug reciprocable with a working fit in a bore provided in said body in transverse intersecting relationship to said passage to control communication between said ports, an O-ring stretched to generally elliptical form in an annular groove provided in said plug inclined at an acute angle with respect to the plug axis so that in the closed position of the plug the low side of the ring is below and the high side of the ring is above the inlet port, the plug in closed position being disposed so that the ring serves to seal off said inlet port from said outlet port, means for reciprocating said plug from closed to open position, and vice versa, means to prevent rotation of said plug, whereby to maintain the O-ring in operative relationship to said inlet port, said plug having its inner end bevelled off in a plane in axially spaced relation to said groove and O-ring to define a cut-off edge at the thin lower end of the bevelled end portion relative to the inlet port, said body having a cylindrical neck portion concentric with said bore, a sleeve disposed in fixed close telescoping relation with said neck and defining a working cylinder therein between the end of said neck and a wall closing the outer end of said sleeve, and a piston in the form of a cylindrical coaxial enlargement of the upper end of said plug substantially equal in diameter to the cylindrical neck portion of said body so as to be adapted to serve as a piston in said cylinder and being reciprocable in said cylinder for reciprocating said plug, said cylinder having ports provided therein on opposite sides of said piston for delivery and discharge of motive fluid, the wall in the outer end of said sleeve being defined by a closure plug adapted to be removed and replaced to facilitate cleaning of the cylinder and piston, said plug for this purpose having an annular groove provided therein intermediate its ends receiving an O-ring of compressible resilient material adapted to be compressed radially between the annular groove and the inside of said sleeve when the plug is inserted therein, and means for detachably securing said closure plug in said sleeve.

References Cited by the Examiner

UNITED STATES PATENTS

| | | | |
|---|---|---|---|
| 2,607,644 | 8/1952 | Smith | 277—165 |
| 2,621,886 | 12/1952 | Mueller | 137—625.47 |
| 2,695,036 | 11/1954 | Kronheim | 251—317 XR |
| 2,704,650 | 3/1955 | Rand | 251—324 |
| 2,778,598 | 1/1957 | Bolling | 251—63 |
| 3,048,191 | 8/1962 | Crang | 251—317 XR |

FOREIGN PATENTS

| | | |
|---|---|---|
| 620,068 | 5/1961 | Canada. |
| 1,218,111 | 12/1959 | France. |
| 409,308 | 2/1925 | Germany. |

M. CARY NELSON, *Primary Examiner.*

ISADOR WEIL, MARTIN P. SCHWADRON,
*Examiners.*

A. JAFFE, E. FEIN, *Assistant Examiners.*